Nov. 16, 1937.     R. L. BANGS ET AL     2,099,669
INSULATED COVER
Filed April 19, 1935
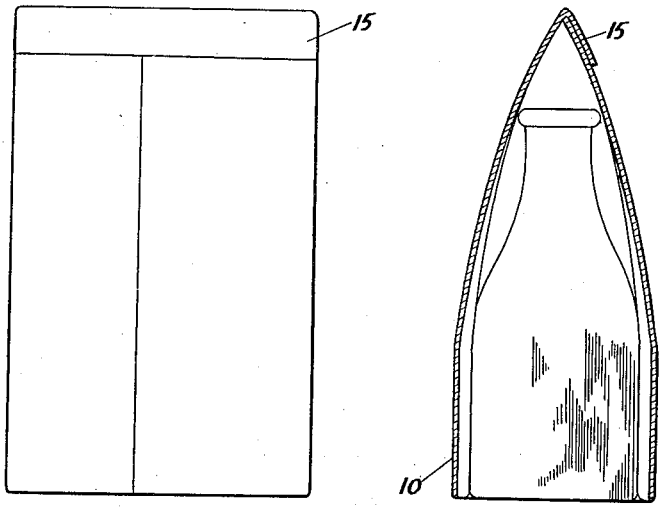
FIG. 1
FIG. 2
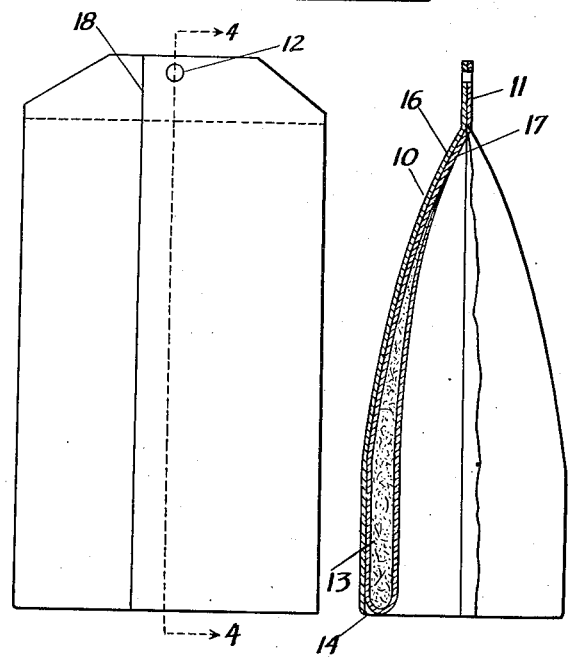
FIG. 3
FIG. 4
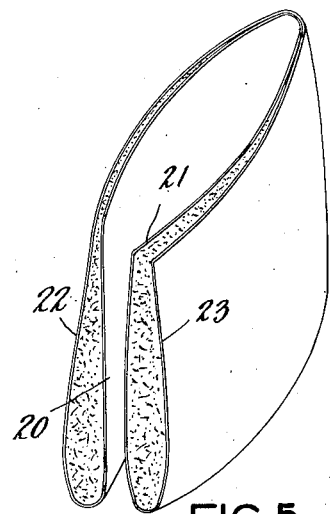
FIG. 5.
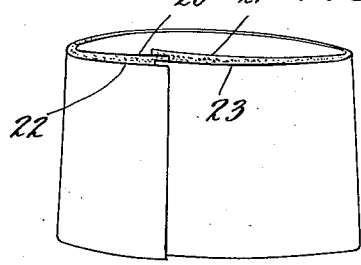
FIG. 6.
INVENTOR
Ralph L. Bangs
BY William A. Hermanson
ATTORNEY

Patented Nov. 16, 1937

2,099,669

UNITED STATES PATENT OFFICE 2,099,669

INSULATED COVER

Ralph L. Bangs, Wakefield, and William A. Hermanson, Brighton, Mass., assignors to Forest Wadding Company, Boston, Mass.

Application April 19, 1935, Serial No. 17,212

5 Claims. (Cl. 229—53)

The present invention relates to insulated covers and more particularly to covers of such a nature as to preserve food stuff in certain existing temperature conditions, and is a continuation in part of our prior application, Serial No. 621,570, filed July 9, 1932.

The present invention more particularly relates to the preservation of food stuffs in the condition that they initially exist and in particular is applied to covering milk bottles when they stand out of doors in the winter or in the summer. In the winter such covers help to keep the milk from freezing, whereas in the summer they keep the milk from getting too warm.

The cover of the present invention, furnishes ordinarily sufficient protection for the food, particularly milk, so that it remains in its initial state for at least two or three hours and sometimes considerably longer. This is usually sufficient time between the delivery of the milk in the case of milk and the time when it is taken into the house and put in proper storage. The cover is usually kept in a place where the milkman can easily get at it and put it over the milk bottle when he delivers the milk. When the milk is taken into the house the cover is put again in its customary place so that the next day the milkman may use it.

From the description given below taken in connection with the drawing, the present invention will be more clearly understood.

Figure 1 shows a view of the cover.

Figure 2 shows a view in section as applied to a milk bottle.

Figure 3 shows a modified form shown in Figure 2.

Figure 4 shows a section taken through the center of Figure 3.

Figure 5 shows a perspective view of the inner liner folded but not assembled in the form used in the container, and Figure 6 shows another perspective view of the liner completed and ready to be inserted in the hood.

The cover as indicated in the figures, comprises an outside water-proof asphaltum kraft paper 10, which is formed in the shape of a hood, and as indicated in Figures 3 and 4 is provided with a peak or wedge top 11 in which the asphaltum kraft paper 10 is adhered in face to face relation.

In Figure 2, the peak may be omitted and the sheet 10 at one side may be folded over to make a border 15 on the other side as indicated at the top of the hood, the border 15 being glued to the asphaltum paper 10 on the side on which it is folded. By employing the wedge form with or without the peak top, the water, if it is raining, sheds off the top of the cover and not only keeps itself dry but prevents the inside of the hood and the bottle from getting wet.

As indicated in Figure 1, the cover is rectangular in shape, and as indicated in the modification in Figure 3, may have the upper corners trimmed off in the peak where the two side sheets adhere in face to face relation. A hole 12 is provided in the top peak where the cover may be hung up on a hook or nail.

As indicated in Figure 4 the inside of the cover is also lined with an asphaltum kraft paper 14 folded over to form a pocket within which may be contained a fibre insulated padding 13. The paper 14 is folded so that a complete paper surface is provided at the bottom of the hood, the paper being held in face to face relation at the top of the hood where the ends 16 and 17 are adhered together.

The paper 14 is preferably formed as indicated in Figures 5 and 6. As indicated in Figure 5, the sheet 14 may have the insulating material adhered to its surface as shown by 13, the sheet being folded on itself if only one sheet is used. The ends are then lapped over one another as indicated in Figure 6, 20 being over 21 and 22 being over 23. If desired however the two ends may simply be laid over one another and riveted or glued together.

The padding as indicated in Figure 4 is fuller at the bottom than at the top of the hood. It should also be noted that the outer kraft paper 10 is carried around the entire hood and is joined by lapping as indicated by the seam 18. The hood or cover is ordinarily flat and made sufficiently wide so that when the bottle of milk is put underneath of it, sufficient expansion will be obtained simply by bowing out the sides of the container. This provides some pressure from the cover itself, and allows the cover to stay on the bottle even though considerable wind may be blowing.

Without describing further details of our invention, we now claim:—

1. An article of the kind described, comprising a water-proof hood, having normally two flat sides adhered together, with edges joined forming a cover with an open bottom and an insulating liner comprising a sheet folded above itself, and having its edges come together at the top of the cover, said liner being filled with an insulating material.

2. An article of the kind described, comprising a water-proof hood of the envelope type, having an insulating liner lining both sides of the hood, said liner comprising a sheet folded above itself and having its ends adhered together at the top of the hood in face to face relation, said liner being filled with an insulating material.

3. An article of the kind described, comprising a water-proof hood of the envelope type, having an insulating liner lining both sides of the hood, said liner comprising a sheet folded above itself and having its ends adhered together at the top of the hood in face to face relation, said liner being filled with wadding material.

4. An article of the kind described, comprising a water-proof hood having side faces extending upward from the top of the hood and adhered together in face to face relation, said hood being of the envelope type and having an insulating lining contained therein.

5. An article of the kind described, comprising a water-proof hood of the wedge type, having side surfaces extending above the top of the hood and adhered together in face to face relation, and a hole provided at the point where said faces adhere together whereby the hood may be suspended.

RALPH L. BANGS.
WILLIAM A. HERMANSON.